April 7, 1964    R. M. MULLER    3,128,329
OPTICAL PROJECTOR LENS SYSTEMS
Filed Nov. 28, 1960    2 Sheets-Sheet 2

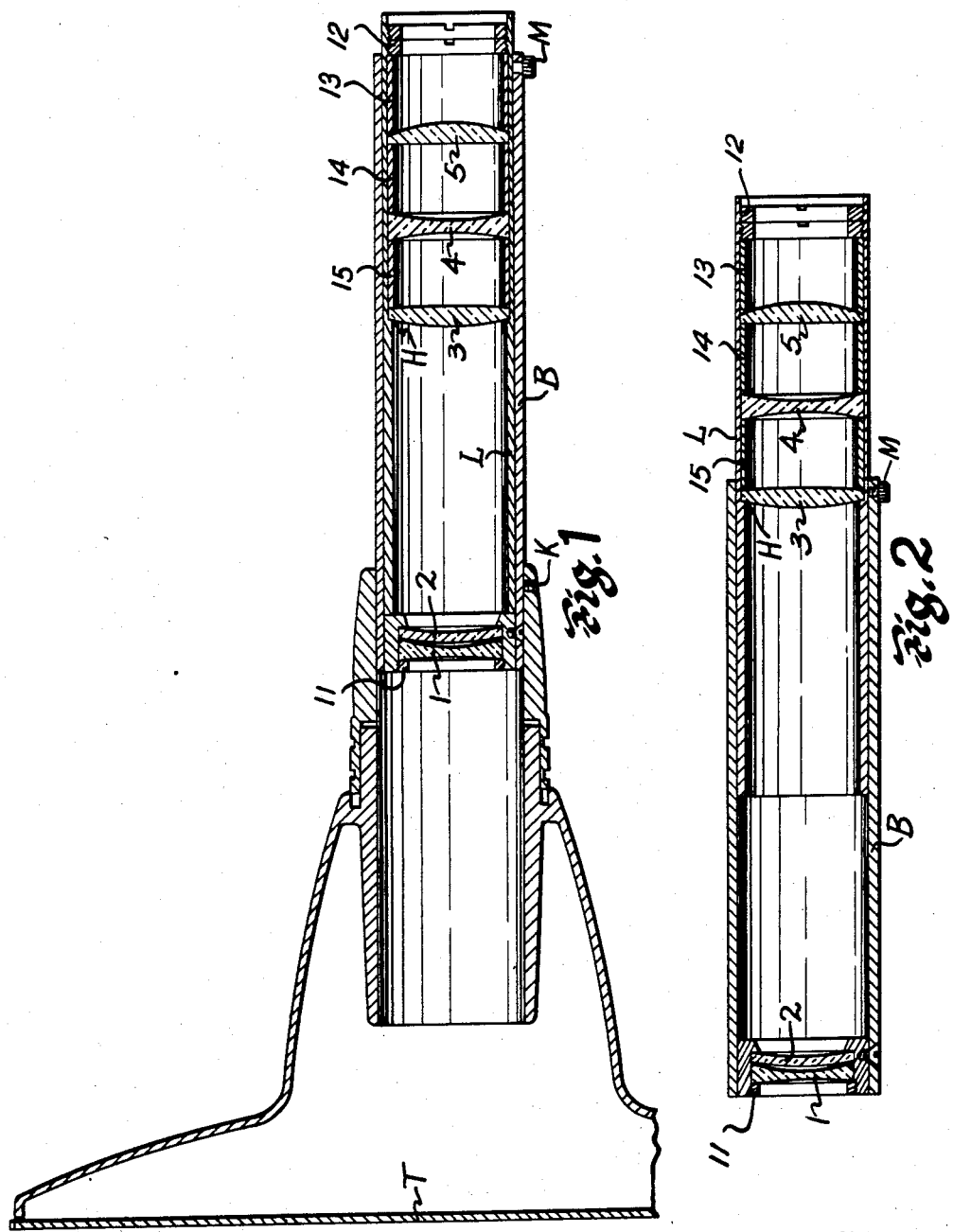

| LENS | N | V | RADII | THICKNESS |
|---|---|---|---|---|
| 1 | 1.517 | 64.5 | $R_1 = +.986F$ | $t_1 = -.0107F$ |
|   |   |   | $R_2 = -.371F$ |   |
|   |   |   |   | $S_1 = -.0007F$ |
| 2 | 1.689 | 30.9 | $R_3 = -.482F$ | $t_2 = -.01F$ |
|   |   |   | $R_4 = -1.353F$ |   |
|   |   |   |   | $S_2$ IS VARIABLE |
| 3 | 1.617 | 55.0 | $R_5 = -.278F$ | $t_3 = -.0197F$ |
|   |   |   | $R_6 = +1.785F$ |   |
|   |   |   |   | $S_3 = -.073F$ |
| 4 | 1.649 | 33.8 | $R_7 = +.275F$ | $t_4 = -.013F$ |
|   |   |   | $R_8 = -.362F$ |   |
|   |   |   |   | $S_4 = -.070F$ |
| 5 | 1.617 | 55.0 | $R_9 = \infty$ | $t_5 = -.019F$ |
|   |   |   | $R_{10} = +.250F$ |   |

INVENTOR
ROBERT M. MULLER
BY
Herbert C. Kimball
ATTORNEY

United States Patent Office 3,128,329
Patented Apr. 7, 1964

3,128,329
OPTICAL PROJECTOR LENS SYSTEMS
Robert M. Muller, Cheektowaga, N.Y., assignor to American Optical Company, Southbridge, Mass., a voluntary association of Massachusetts
Filed Nov. 28, 1960, Ser. No. 72,192
2 Claims. (Cl. 88—57)

This invention relates to an optical system which can be used for the projection of transparencies upon a screen. It is highly desirable, when using such a system for projecting letters and other symbols for testing the visual anomalies of the human eye, to adjust the system so as to bring the letters and symbols to accurate size and at the same time to bring these letters and symbols into accurate focus on the screen. I have developed an optical system for this purpose comprising a well-corrected, negative doublet which is positioned adjacent the transparency to be projected, in combination with a Cooke triplet. The term "Cooke triplet" as the term is used in this specification, means a well-corrected three element objective with the three elements spaced apart, and with the central element negative and the two outer elements positive. For the purpose of projecting the test symbols and letters above referred to, only a small field is required and a wide variety of Cooke triplets may be used with excellent results.

The projector to which the present invention relates is used in the examining room of the practitioner, and as these rooms vary in size, the distance from the patient to the screen will in general vary between 10 feet as a minimum and 20 feet as a maximum. One purpose of the present invention is to provide an optical system which by adjustment of the separation between the negative doublet and the Cooke triplet will provide a projected image of the letters or symbols to the proper magnifiation according to the distance from which the person under test views the test images. A further advantage of my invention is that by adjustment of the entire lens system relative to the transparency the image on the screen can be brought into accurate focus at the adjusted magnification.

A preferred example of optical system for projecting transparencies according to my invention is shown in the accompanying drawing in which FIG. 1 is an axial section through my improved optical system mounted in the lens barrel of a projector; the separation between the negative doublet and the Cooke triplet being at a minimum;

FIG. 2 is a similar axial section, the separation between the negative doublet and the Cooke triplet being at a maximum;

Figures 3, 4:
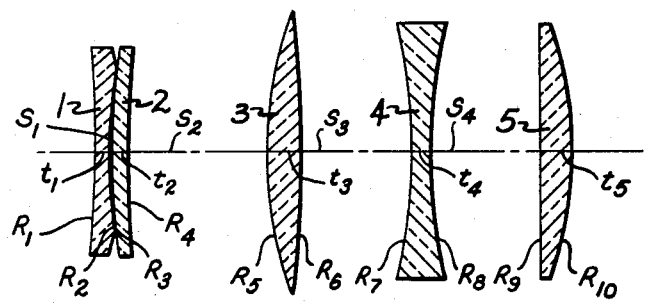
FIG. 3 shows a preferred form of the improved optical system.

FIG. 4 gives constructional data for the optical system of FIG. 3.

Referring to FIGS. 1 and 2, the transparency carrying the letters and symbols to be projected is shown at T. The component adjacent this transparency is the well-corrected negative doublet made up of a negative element 1 of borosilicate crown and a second element 2 of extra dense flint. This doublet is positioned in one end of an extensible barrel B and is retained in the barrel by a retaining ring 11. The extensible barrel B as a whole is held in adjusted position relative to the transparency T by a screw K.

The Cooke triplet is positioned at some distance along the barrel B from the doublet and is positioned in the telescoping member L of the barrel against a shoulder H by a retaining ring 12, there being spacing rings 13, 14 and 15 for positioning the Cooke triplet with the desired separation between the three elements. The first element 3 of the Cooke triplet and also the third element 5 are made of dense barium crown and the intermediate negative element 4 is made of dense flint. The telescoping member L of the barrel is held in adjusted position by the set screw M.

The first element 1 of the doublet, which for mechanical reasons should preferably have a spacing less than $-0.53$ times the equivalent focal length of the doublet from the transparency T, is a negative element with the surface of shorter radius away from the object. Calling the effective focal length of the doublet F, the second element 2 of the doublet is spaced $-.0007F$ along the optical axis from the first element, and has an annular contact with the first element. In the example shown, the diameter of this annular contact is $-.097F$. Such a doublet, when made from the glasses specified, is well corrected for color and aberrations are held within limits which result in an excellent quality of projected image.

FIG. 3 gives constructional data for the preferred form of my optical system based on F=E.F.L. of the negative doublet, and this table of data is repeated below:

| Lens | N | V | Radii | Thickness |
|---|---|---|---|---|
| 1 | 1.517 | 64.5 | $R_1 = +.986F$ | $t_1 = -.0107F$ |
|   |       |      | $R_2 = -.371F$ | $S_1 = -.0007F$ |
| 2 | 1.689 | 30.9 | $R_3 = -.482F$ | $t_2 = -.01F$ |
|   |       |      | $R_4 = -1.353F$ | $S_2$ is variable |
| 3 | 1.617 | 55.0 | $R_5 = -.278F$ | $t_3 = -.0197F$ |
|   |       |      | $R_6 = +1.785F$ | $S_3 = -.073F$ |
| 4 | 1.649 | 33.8 | $R_7 = +.275F$ | $t_4 = -.013F$ |
|   |       |      | $R_8 = -.362F$ | $S_4 = -.070F$ |
| 5 | 1.617 | 55.0 | $R_9 = \infty$ | $t_5 = -.019F$ |
|   |       |      | $R_{10} = +.250F$ | |

In the table the numbers of the lens elements as above described appear in the first column, the corresponding refractive indices N for the D line of the spectrum and the dispersive index V are given in the second and third columns respectively. In the fourth column the radii of curvatures R are given, and in the last column are given the thicknesses $t$ of the lens elements and the spaces S between elements.

The importance of the doublet is that it is well corrected so as to provide a virtual image which changes as to magnification and position with adjustment of object distance. This virtual image is projected by the Cooke triplet to provide the screen image.

It will be apparent that when letters and symbols are projected for testing visual anomalies, the magnification of the image on the screen is to be determined by the distance from which the person under test views these test images. In the following table which shows the results of various spacings of my improved lens system where F is equal to $-300.29$ millimeters, the resulting magnification of the images on the screen is given under the letter M in column 1, the distance in feet from which the person under test views the test images is given under the letter V in column 2, and the spacing in millimeters between the transparency T and the nearest surface of element 1 of the negative doublet is given under the letter D in column 3. Columns 4 and 5 under the letters $S_2$ and $D_5$ give respectively the spacing in millimeters of the Cooke triplet from the negative doublet, and the distance from the screen to the nearest surface of the element 5. The total distance in feet from transparency to the screen is given under the letter $D_6$ in the last column.

| M | V, feet | D, mm. | $S_2$, mm. | $D_5$, mm. | $D_6$, feet |
|---|---|---|---|---|---|
| 8.31 | 10 | 23.32 | 186.55 | 2159.77 | 7.988 |
| 8.31 | 10 | 72.01 | 147.29 | 2455.47 | 8.989 |
| 8.31 | 10 | 119.30 | 117.85 | 2742.62 | 9.99 |
| 9.97 | 12 | 52.73 | 157.82 | 2769.31 | 9.99 |
| 11.63 | 14 | 107.80 | 118.86 | 3668.53 | 12.993 |
| 12.465 | 15 | 113.79 | 114.57 | 3972.02 | 13.994 |
| 12.465 | 15 | 49.25 | 156.76 | 3384.08 | 11.992 |
| 12.465 | 15 | 81.70 | 133.77 | 3679.70 | 12.993 |
| 12.465 | 15 | 145.58 | 98.27 | 4261.57 | 14.995 |
| 14.958 | 18 | 101 | 119.67 | 4589.80 | 15.996 |
| 14.958 | 18 | 154.45 | 92.19 | 5173.98 | 17.998 |
| 16.620 | 20 | 110.72 | 113.08 | 5196.89 | 17.998 |
| 16.620 | 20 | 140.91 | 97.53 | 5563.61 | 19.249 |
| 16.620 | 20 | 158.95 | 89.21 | 5782.71 | 20 |

My improved lens system is particularly advantageous for use in a projector where adjustment in the distance between the Cooke triplet and the screen is desired without such accompanying change in the magnification of the image as to interfere with the use of the image for testing purposes. As above pointed out, it is important that the negative doublet be well-corrected, but a wide variety of Cooke triplets may be used in combination with this negative doublet for obtaining a clear and distinct image on the screen.

I claim:
1. An optical system for an optical projector comprising the combination of a well corrected negative doublet closely adjacent the object to be projected, and a Cooke triplet cooperating with said doublet for producing an image of said object, the spacing between said doublet and said triplet being variable in accordance with the magnification of image to be obtained, said doublet being formed of two lenses and the Cooke triplet being formed of three lenses, in which the refractive indices N and dispersive indices V of the lenses, the radii of curvatures R of the optical surfaces, the thickness $t$ of the lenses and the spaces S between components are substantially as listed in order from front to rear under the respective headings in the following table:

| Lens | N | V | Radii | Thickness |
|---|---|---|---|---|
| 1 | 1.517 | 64.5 | $R_1=+.986F$ | $t_1=-.0107F$ |
| | | | $R_2=-.371F$ | $s_1=-.0007F$ |
| 2 | 1.689 | 30.9 | $R_3=-.482F$ | $t_2=-.01F$ |
| | | | $R_4=-1.353F$ | $S_2$ is variable |
| 3 | 1.617 | 55.0 | $R_5=-.278F$ | $t_3=-.0197F$ |
| | | | $R_6=+1.785F$ | $S_3=-.073F$ |
| 4 | 1.649 | 33.8 | $R_7=+.275F$ | $t_4=-.013F$ |
| | | | $R_8=-.362F$ | $S_4=-.070F$ |
| 5 | 1.617 | 55.0 | $R_9=\infty$ | $t_5=-.019F$ |
| | | | $R_{10}=+.250F$ | | and wherein F is the effective focal length of said doublet.

2. An optical system for use in an optical projector for testing the visual anomalies of the human eye or the like, said system comprising in combination a well corrected Cooke triplet and a well corrected negative doublet disposed in optical alignment, said negative doublet being positioned between said triplet and object to be projected so as to provide a virtual image of said object, and being adjustable relative to said triplet so as to vary the size of said virtual image and thereby bring the magnitfication of the image projected by said triplet onto an associated viewing screen at a preselected distance from said projector to the correct size desired for viewing purposes, and said doublet and triplet being simultaneously adjustable relative to said object for accurate focus of said projected image, the first element of said doublet being a bi-concave negative element formed of a borosilicate crown glass and having its surface of longer radius facing said object, and the second element of said doublet being a positive element arranged in close axially spaced relation thereto and formed of an extra dense flint glass, the refractive indices N and dispersive values V, the radii of curvatures R of the optical surfaces, the axial thicknesses $t$ of the lenses and the spacing $s$ therebetween being substantially as listed in order under the respective headings in the following table:

| Lens | N | V | Radii | Thicknesses and Spacing |
|---|---|---|---|---|
| 1 | 1.517 | 64.5 | $R_1=+.986F$ | $t_1=-.0107F$ |
| | | | $R_2=-.371F$ | $s_1=-.0007F$ |
| 2 | 1.689 | 30.9 | $R_3=-.482F$ | $t_2=-.01F$ |
| | | | $R_4=-1.353F$ | | and wherein F is the effective focal length of said doublet.

References Cited in the file of this patent
UNITED STATES PATENTS

| 1,174,547 | Clason | Mar. 7, 1916 |
| 2,165,365 | Frederick et al. | July 11, 1939 |
| 2,184,018 | Ort | Dec. 19, 1939 |
| 2,394,959 | Wynne | Feb. 12, 1946 |
| 2,603,127 | Tiller et al. | July 15, 1952 |

OTHER REFERENCES

Merte, W.: Photographic Lenses, Parts 1 and 2, Central Air Documents Office, Dayton, Ohio, 1949, pp. 350–352.